(12) United States Patent
Sano et al.

(10) Patent No.: US 8,486,182 B2
(45) Date of Patent: Jul. 16, 2013

(54) METHOD AND SYSTEM FOR REMOVING CARBON DIOXIDE FROM EXHAUST GAS BY UTILIZING SEAWATER

(75) Inventors: Kenji Sano, Tokyo (JP); Yukishige Maezawa, Hachioji (JP); Toru Ushirogouchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 5 days.

(21) Appl. No.: 13/208,805

(22) Filed: Aug. 12, 2011

(65) Prior Publication Data

US 2011/0300043 A1     Dec. 8, 2011

Related U.S. Application Data

(63) Continuation of application No. PCT/JP2010/000866, filed on Feb. 12, 2010.

(30) Foreign Application Priority Data

Mar. 11, 2009   (JP) ................. 2009-058752

(51) Int. Cl.
*B01D 53/14*   (2006.01)
*B01D 53/62*   (2006.01)

(52) U.S. Cl.
USPC ............. 95/205; 95/236; 423/220; 423/423; 423/471

(58) Field of Classification Search
USPC ............... 95/149, 205, 236; 423/220, 423, 423/471; 210/767
See application file for complete search history.

(56) References Cited

U.S. PATENT DOCUMENTS

| | | | |
|---|---|---|---|
| 6,180,012 | B1 | 1/2001 | Rongved |
| 7,309,440 | B2 | 12/2007 | Borseth |
| 2003/0055117 | A1 | 3/2003 | O'Rear et al. |
| 2005/0087496 | A1 | 4/2005 | Borseth |
| 2008/0173588 | A1 | 7/2008 | Borseth |
| 2008/0307968 | A1 | 12/2008 | Kang et al. |
| 2010/0196244 | A1* | 8/2010 | Grauer et al. ............... 423/423 |

FOREIGN PATENT DOCUMENTS

| | | |
|---|---|---|
| CN | 101318651 | 12/2008 |
| EP | 1474364 | 1/2011 |
| GB | 2382041 | 5/2003 |

(Continued)

OTHER PUBLICATIONS

English tanslation of International Preliminary Report on Patentability and Written Opinion of the International Searching Authority issued Oct. 27, 2011, in PCT/JP2010/000866.

(Continued)

*Primary Examiner* — Frank Lawrence, Jr.
(74) *Attorney, Agent, or Firm* — Oblon, Spivak, McClelland, Maier & Neustadt, L.L.P.

(57) ABSTRACT

According to one embodiment, a method for removing carbon dioxide in an exhaust gas utilizing seawater includes: blowing ammonia into seawater to produce ammonia-saturated seawater; contacting an exhaust gas under a state of non-heat with the ammonia-saturated seawater so that carbon dioxide in the exhaust gas is absorbed in the ammonia-saturated seawater; and splaying a solution containing sodium hydrogen carbonate and ammonium chloride which are produced through absorption of the carbon dioxide by the ammonia-saturated seawater utilizing pressure of the exhaust gas while cooling the solution utilizing heat of evaporation of a solvent of the solution so as to settle out and recover the sodium hydrogen carbonate and the ammonium chloride.

10 Claims, 2 Drawing Sheets

FOREIGN PATENT DOCUMENTS

| | | |
|---|---|---|
| JP | 2000-140651 | 5/2000 |
| JP | 2004-352587 | 12/2004 |
| JP | 2005-502460 | 1/2005 |
| JP | 2008-296216 | 12/2008 |
| KR | 10-0851493 | 8/2008 |
| KR | 10-2009-0038623 | 4/2009 |
| WO | 01/96243 | 12/2001 |
| WO | 03/024604 | 3/2003 |
| WO | 03/068685 | 8/2003 |
| WO | 2007/094691 | 8/2007 |
| WO | 2007/139392 | 12/2007 |
| ZA | 200206896 | 4/2003 |

OTHER PUBLICATIONS

International Search Report issued Jun. 1, 2010 in PCT/JP2010/000866 filed Feb. 12, 2010.

* cited by examiner

METHOD AND SYSTEM FOR REMOVING CARBON DIOXIDE FROM EXHAUST GAS BY UTILIZING SEAWATER

CROSS-REFERENCE TO RELATED APPLICATIONS

This application is a continuation of prior International Application No. PCT/JP2010/000866, filed on Feb. 12, 2010 which is based upon and claims the benefit of priority from Japanese Patent Application No. 2009-058752, filed on Mar. 11, 2009; the entire contents of all of which are incorporated herein by reference.

FIELD

Embodiments described herein relate generally to a method and system for removing carbon dioxide from exhaust gas by utilizing seawater.

BACKGROUND

Since thermal power plants and garbage incineration plants have low restriction (lenient regulations) for installation site, the thermal power plants and the garbage incineration plants are constructed at many locations all over the world. Moreover, since a large amount of carbon dioxide is exhausted from these plants, the emission reduction of the carbon dioxide calls for urgent attention in view of the recent interest to global warming issue and the background of tightening of regulation for the global warming.

In order to reduce the amount of emission of the carbon dioxide, the high efficiency of the plants is attempted while a method and system for absorbing the carbon dioxide exhausted. For example, it is taught in a conventional technique that calcium hydroxide ($Ca(OH)_2$) and ammonia ($NH_3$) are reacted one another to produce ammonium hydroxide ($NH_4OH$), which is introduced with seawater into a predetermined treatment equipment so that the exhaust gas containing the carbon dioxide is contacted with thus obtained solution containing the ammonium hydroxide and the seawater and thus the carbon dioxide is absorbed in the solution.

In this method, however, the calcium hydroxide is made through the hydrolysis of calcium oxide (CaO) and the calcium oxide is made through the thermolysis of calcium carbonate ($CaCO_3$). In the thermolysis of calcium carbonate, carbon dioxide is also produced with the calcium oxide at equimolar concentration. In the aforementioned method, therefore, when the ammonium hydroxide as the raw material to be used for the absorption of the carbon dioxide is produced, the carbon dioxide is also produced at equimolar concentration so that even though the carbon dioxide in the exhausted gas is absorbed with the ammonium hydroxide, additional carbon dioxide is produced again at the same amount as absorbed carbon dioxide. As a result, the problem of the reduction of the emission amount of the carbon dioxide cannot be realized.

Moreover, a plurality of by-products are produced at the absorption of the carbon dioxide, but the conventional technique does not teach the treatment for the by-products. Therefore, the aforementioned conventional technique cannot be applied for the absorption of the carbon dioxide exhausted from the practical plants.

DETAILED DESCRIPTION

According to one embodiment, a method for removing carbon dioxide in an exhaust gas utilizing seawater includes: blowing ammonia into seawater to produce ammonia-saturated seawater; contacting an exhaust gas under a state of non-heat with the ammonia-saturated seawater so that carbon dioxide in the exhaust gas is absorbed in the ammonia-saturated seawater; and spraying a solution containing sodium hydrogen carbonate and ammonium chloride which are produced through absorption of the carbon dioxide by the ammonia-saturated seawater utilizing pressure of the exhaust gas while cooling the solution utilizing heat of evaporation of a solvent of the solution so as to settle out and recover the sodium hydrogen carbonate and the ammonium chloride.

First Embodiment

Figure 1:
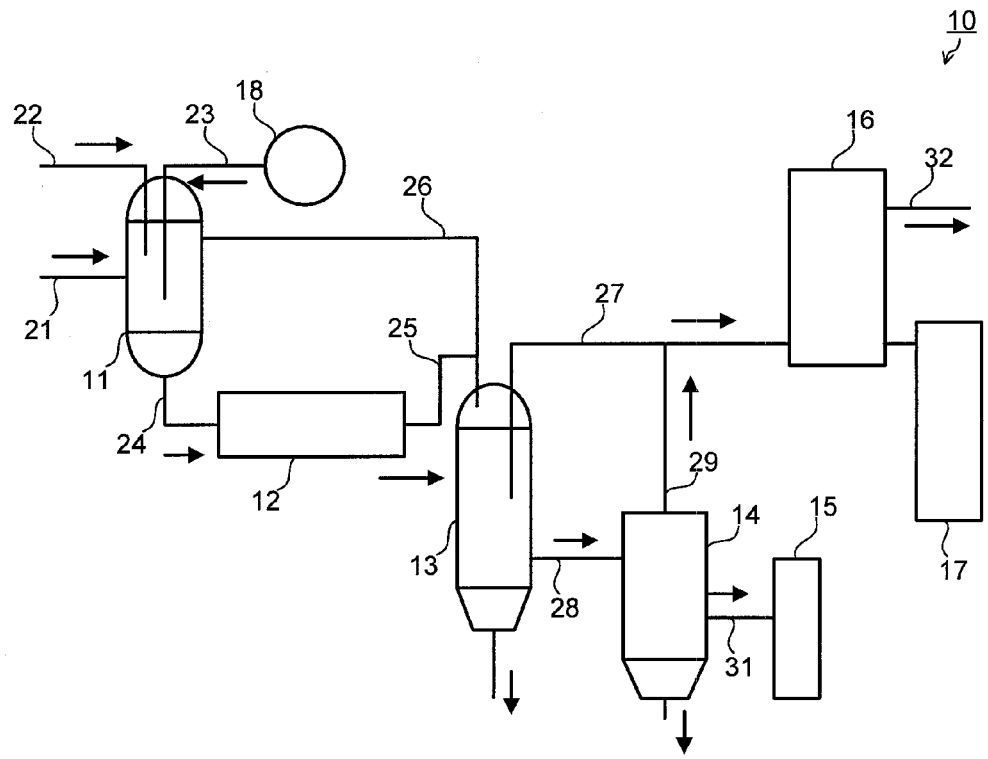
FIG. 1 is a schematic view showing the structure of a system for removing carbon dioxide from an exhaust gas utilizing seawater according to a first embodiment.

FIG. 1 is a schematic view showing the structure of a system for removing carbon dioxide from an exhaust gas utilizing seawater according to this embodiment.

As is apparent from FIG. 1, the carbon dioxide-removing system 10 in this embodiment includes the carbon dioxide absorbing tank 11, the first reservoir 12, the first settling tank 13 and the second settling tank 14 which are subsequently provided from the upstream of the removing system 10. The carbon dioxide absorbing tank 11 is a tank for absorbing carbon dioxide in exhaust gas as will be described hereinafter, and the first reservoir 12 is a tank for reserving a solution of sodium hydrogen carbonate and a solution of ammonium chloride which are produced as the result of the absorption of the carbon dioxide at the carbon dioxide absorbing tank 11. The first settling tank 13 and the second settling tank 14 are tanks for settling the sodium hydrogen carbonate and the ammonium chloride out from the solution and then collecting the sodium hydrogen carbonate and the ammonium chloride.

Then, the second reservoir 15 for reserving a dilute ammonium chloride aqueous solution which is obtained from the ammonium chloride solution by removing the ammonium chloride is provided in the downstream of the second settling tank 14, and a cooling tank 16 for cooling and collecting moisture vapor produced and a third reservoir 17 for reserving fresh water which is obtained by cooling the produced moisture vapor are provided in parallel with the second reservoir 15.

The removal of carbon dioxide using the carbon dioxide removing system shown in FIG. 1 is conducted below.

First of all, seawater is supplied and charged into the carbon dioxide absorbing tank 11 via a pipe 21 while ammonia is supplied into the carbon dioxide absorbing tank 11 from an ammonia supplying tank 18 via a pipe 23 so that the ammonia is saturated in the seawater to produce ammonia-saturated seawater. Then, a non-heated exhaust gas is introduced into the carbon dioxide absorbing tank 11 via a pipe 22 so as to be contacted with the ammonia-saturated seawater.

In this case, the carbon dioxide contained in the exhaust gas is chemically reacted with the ammonia-saturated seawater in accordance with the reaction formula (1) as indicated below and thus absorbed into the ammonia-saturated seawater. The reaction formula (1) is the same as one of the reaction formulas related to the production of sodium carbonate using ammonia soda process. Here, the "non-heated exhaust gas" means an exhaust gas not positively heated for a specific purpose and thus an exhaust gas kept at room temperature (about 20° C.), for example.

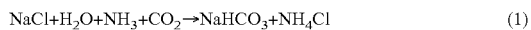
$$NaCl+H_2O+NH_3+CO_2 \rightarrow NaHCO_3+NH_4Cl \qquad (1)$$

As apparent from the reaction formula (1), when the carbon dioxide is absorbed in the carbon dioxide absorbing tank 11, the sodium hydrogen carbonate (baking soda) and the ammonium chloride are produced as by-products accompanied with the absorption of the carbon dioxide. Therefore, the step of recovering the sodium hydrogen carbonate (baking soda) and the ammonium chloride is required as the subsequent step.

In this embodiment, the solution containing the sodium hydrogen carbonate and the ammonium chloride is once reserved in the first reservoir 12 via a pipe 24 and then transferred into the first settling tank 12 via a pipe 25 using the pressure of the exhaust gas to be introduced into the first settling tank 13 from the carbon dioxide absorbing tank 11 via a pipe 26.

Here, since the exhaust gas is used via the carbon dioxide absorbing tank 11, the exhaust gas is cooled with the ammonia-saturated seawater in the carbon dioxide absorbing tank 11 before the introduction of the exhaust gas into the carbon dioxide absorbing tank 11 even though the exhaust gas is kept at a high temperature.

The solubility of the ammonium chloride is higher than the solubility of the sodium hydrogen carbonate, e.g., seven times as high as the solubility of the sodium hydrogen carbonate at room temperature (about 20° C.). In this embodiment, therefore, first of all, the sodium hydrogen carbonate is settled out in the first settling tank 13 and then recovered therefrom. Concretely, the solution containing the sodium hydrogen carbonate and the ammonium chloride is sprayed in the first settling tank 13. In this case, since the solvent contained in the solution is evaporated and gasified, the solution is cooled by the heat of vaporization so that the temperature of the solution is decreased. The solvent mainly contains water, but may contain an additional solvent such as non-reacted ammonia.

As a result, since the solubility of salt of the seawater in the solution becomes equal or larger than the solubility of the sodiumhydrogen carbonate, the sodiumhydrogen carbonate cannot be dissolved anymore in the solution and thus settled out. By recovering the thus produced sediment, therefore, the sodium hydrogen carbonate as the by-product produced by the absorption of the carbon dioxide can be recovered.

For example, since the content of salt of seawater is 3.5 wt % (0.6 mol/l), if the water contained in the solution is evaporated by means of spraying using the exhaust gas and cooled up to about 0° C., the solubility of salt of seawater in the solution can be increased almost equal to or more than the solubility of 0.77 mol/l of sodium hydrogen carbonate, so that the sodium hydrogen carbonate can be settled out.

Then, the solution containing the residual ammonium chloride is introduced into the second settling tank 14 from the first settling tank 13 via a pipe 28. In this case, the solution is sprayed again in the second settling tank 14 using the pressure of the exhaust gas. Thereby, the solubility of salt of seawater in the solution becomes equal to or more than the solubility of the ammonium chloride in the solution in the same manner as the sodium hydrogen carbonate, the ammonium chloride cannot be dissolved anymore in the solution and thus settled out. By recovering the thus produced sediment, therefore, the ammonium chloride as the by-product produced by the absorption of the carbon dioxide can be recovered in the same manner as described above.

The dilute ammonium chloride aqueous solution, which is obtained by settling the ammonium chloride out in the second settling tank 14, is reserved in the second reservoir via a pipe 31.

Moreover, the moisture vapor produced by the spraying in the first settling tank 13 and the second settling tank 14 is passed through the cooling tank 16 to be made fresh water, which is reserved in the third reservoir 17.

The exhaust gas from which the carbon dioxide is removed is discharged from the cooling tank 16 via a pipe 32.

In this way, in this embodiment, since the carbon dioxide is absorbed using the ammonia-saturated seawater made of seawater and ammonia and not using a raw material to secondarily produce a large amount of carbon dioxide, the absorption and recovery of the carbon dioxide can be realized under the condition that additional carbon dioxide is not produced at the same molar concentration as the absorbed carbon dioxide. Moreover, since the sodium hydrogen carbonate and the ammonium chloride as the by-products can be recovered, a practical method and system can be provided for the absorption of the carbon dioxide discharged from plants such as thermal power plants and garbage incineration plants.

In the practical absorption of 1 g (0.023 mol) of carbon dioxide, the equimolar ammonia is required. In this case, the euimolar ammonia corresponds to 0.39 g of ammonia. The amount of carbon dioxide produced in the production of 1 g of ammonia is 0.36 g according to the primary unit of data of easy-LCA (produced by Toshiba Corp. at 2000) so that in the case of the production of 0.39 g of ammonia, 0.14 g of carbon dioxide is produced. Supposed that carbon dioxide produced in another process is not considered, the minimum amount of the thus produced carbon dioxide can be estimated as 1.14 g and if 1 g of the estimated amount of the produced carbon dioxide is absorbed and immobilized at a yield of 100%, the ratio of immobilization of the produced carbon dioxide becomes 87.9%. Since the ratio of immobilization of the produced carbon dioxide is not changed at a large scale, the ratio of recover (ratio of immobilization) of the produced carbon dioxide becomes about 88% in this embodiment.

Since the sodium hydrogen carbonate can be used as baking soda and the ammonium chloride can be used as fertilizer, the reaction products produced in the absorption of the carbon dioxide can be reused not as substances harmful for human being but as resources. In this embodiment, moreover, the seawater can be partially made fresh water in the absorption of the carbon dioxide as described above.

It is apparent, therefore, that the method and system for removing the carbon dioxide in this embodiment are excellent so as not to cause environmental destruction and the like.

In this embodiment, the exhaust gas discharged from the cooling tank 16 may be circulated in the system shown in FIG. 1 and treated repeatedly depending on the concentration of the carbon dioxide of the exhaust gas. When the spraying is conducted in the first settling tank 13 and the second settling tank 14, moreover, another exhaust gas kept at high temperature may be introduced into the first settling tank 13 and the second settling tank 14 via another route so as to promote the evaporation of the solvent, that is, the water or the like.

Second Embodiment

Figure 2:
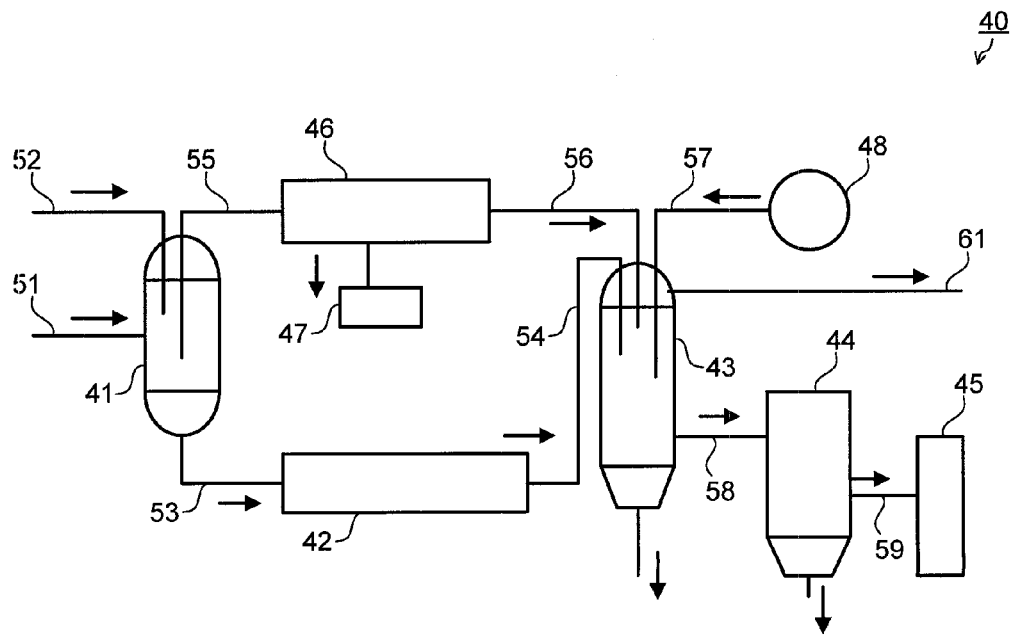
FIG. 2 is a schematic view showing the structure of a system for removing carbon dioxide from an exhaust gas utilizing seawater according to a second embodiment.

FIG. 2 is a schematic view showing the structure of a system for removing carbon dioxide from an exhaust gas utilizing seawater according to this embodiment.

As is apparent from FIG. 2, the carbon dioxide-removing system 40 in this embodiment includes a seawater-concentrating tank 41, a first reservoir 42, a carbon dioxide absorbing tank 43 and a settling tank 44 which are subsequently provided from the upstream of the removing system 40. As described below, the seawater concentrating tank 41 is a tank for increasing the concentration of salt of seawater at the carbon dioxide absorbing tank 43 so that the absorption of carbon dioxide and the settling of sodium hydrogen carbonate as a reaction product can be conducted simultaneously, and the first reservoir 42 is a tank for reserving the seawater concentrated at the seawater concentrating tank 41.

Moreover, the carbon dioxide absorbing tank 43 is a tank for conducting the absorption of carbon dioxide and the settling of sodium hydrogen carbonate as a reaction product simultaneously as described above, and the settling tank 44 is a tank for settling and recovering ammonium chloride as a reaction product.

Then, a second reservoir 45 for reserving a dilute ammonium chloride aqueous solution which is obtained from a solution containing the ammonium chloride by removing the ammonium chloride is provided in the downstream of the settling tank 44. Moreover, a cooling tank 46 for cooling the moisture vapor obtained from the seawater through concentration and then converting the moisture vapor into fresh water and a third reservoir 47 for reserving the fresh water are provided in the downstream of the seawater concentrating tank 41.

The removal of carbon dioxide using the carbon dioxide removing system 40 shown in FIG. 2 is conducted below.

First of all, seawater is supplied and charged into the seawater concentrating tank 11 via a pipe 51 while an exhaust gas kept at 100° C. or more is supplied into the seawater concentrating tank 11 via a pipe 52. As the high temperature exhaust gas can be used an exhaust gas discharged from a thermal power plant or a garbage incineration plant as it is. In this case, in the seawater concentrating tank 41, the moisture of the seawater is evaporated by the exhaust gas so as to increase the concentration of salt of the seawater within a range of 3.5 wt % (0.6 mol/l) to 25 wt % (4.3 mol/l), for example. Here, since the saturated concentration of salt is 30 wt % or less, it is difficult to increase the concentration of salt of the seawater beyond 30 wt %.

The upper limited temperature of the exhaust gas is not particularly restricted only if the exhaust gas does not affect the system shown in FIG. 2, particularly to the seawater concentrating tank 41. As of now, the upper limited temperature of the exhaust gas may be set to about 200° C.

Thereafter, the thus obtained concentrated seawater is reserved in the first reservoir 42 via a pipe 53 and then introduced into the carbon dioxide absorbing tank 43 via a pipe 54. On the other hand, ammonia is supplied into the carbon dioxide absorbing tank 43 from an ammonia supplying tank 48 via a pipe 57 so as to saturate the concentrated seawater therewith and thus produce ammonia-saturating concentrated seawater. Then, the exhaust gas cooled at the seawater concentrating tank 41 is introduced into the carbon dioxide absorbing tank 43 and contacted with the ammonia-saturated seawater.

In this case, the carbon dioxide contained in the exhaust gas is chemically reacted with the ammonia-saturating concentrated seawater according to the aforementioned reaction formula (1) and thus absorbed through the chemical reaction indicated in the reaction formula (1). Simultaneously, the sodium hydrogen carbonate (baking soda) as a reaction product cannot be dissolved in the ammonia-saturating concentrated seawater because the concentration of salt of the ammonia-saturating concentrated seawater is already increased to about 25 wt % (4.3 mol/l), and thus settled out under no spraying, different from the first embodiment.

On the other hand, since the ammonium chloride as a reaction product similar to the sodium hydrogen carbonate has a solubility seven times as high as the solubility of the sodium hydrogen carbonate, the ammonium chloride cannot be settled out in the carbon dioxide absorbing tank 43.

Therefore, the solution containing the ammonium chloride is introduced into the settling tank 44 via a pipe 58. In this case, the solution is sprayed using the pressure of the exhaust gas in the settling tank 44. Thereby, since the solvent, that is, the water of the solution is evaporated while the solvent is cooled by the heat of evaporation, the solubility of salt of the seawater in the solution becomes equal or larger than the solubility of the ammonium chloride in the solution. As a result, since the ammonium chloride is settled out, the ammonia chloride can be recovered by recovering the sediment of ammonia chloride.

The dilute ammonium chloride aqueous solution, which is obtained by settling the ammonium chloride out in the settling tank 44, is reserved in the second reservoir 45 via a pipe 59.

Moreover, the moisture vapor produced by the introduction of the high temperature exhaust gas is passed through the cooling tank 46 to be made fresh water, which is reserved in the third reservoir 47.

The exhaust gas from which the carbon dioxide is removed is discharged from the carbon dioxide absorbing tank 43 via a pipe 61.

In this way, in this embodiment, since the carbon dioxide is absorbed using the ammonia-saturating concentrated seawater made of seawater and ammonia and not using a raw material to secondarily produce a large amount of carbon dioxide, the absorption and recovery of the carbon dioxide can be realized under the condition that additional carbon dioxide is not produced at the same molar concentration as the absorbed carbon dioxide. Moreover, since the sodium hydrogen carbonate and the ammonium chloride as the by-products can be recovered, a practical method and system can be provided for the absorption of the carbon dioxide discharged from plants such as thermal power plants and garbage incineration plants.

Other features and advantages are similar to those in first embodiment. For example, another cooling tank for cooling the moisture vapor produced in the settling tank 44 may be provided and a fourth reservoir for the cooled moisture vapor (condensed fresh water) may be provided.

Third Embodiment

Figure 3:
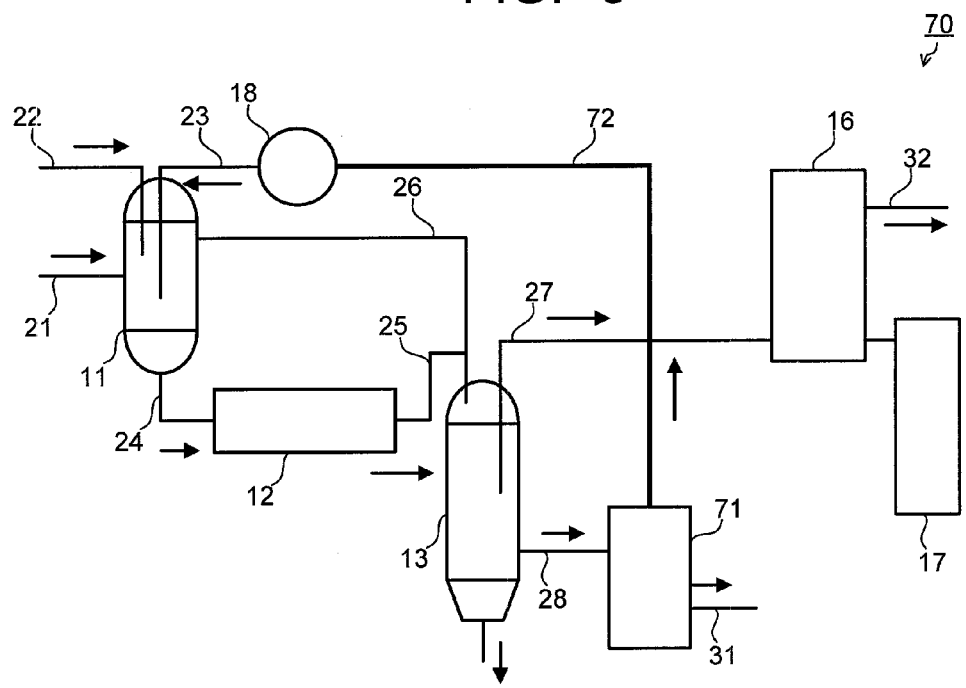
FIG. 3 is a schematic view showing the structure of a system for removing carbon dioxide from an exhaust gas utilizing seawater according to a third embodiment.

FIG. 3 is a schematic view showing the structure of a system for removing carbon dioxide from an exhaust gas utilizing seawater according to this embodiment. This embodiment is a modified embodiment for the first embodiment related to FIG. 1. Concretely, the system structure in this embodiment is different from the system structure in the first embodiment in that the second settling tank 14 in FIG. 1 is substituted with an exhaust gas heating tank 71 and the pipe 16 to be connected with the cooling tank 16 is substituted with a pipe 72 to be connected with the ammonia supplying tank 18 above the exhaust gas heating tank 71. Therefore, only these different components will be described below.

The absorption of carbon dioxide in the carbon dioxide absorbing tank 11 and the settling and recovering of sodium hydrogen carbonate as a reaction product in the first settling tank 13 are conducted in the same manner as in the first embodiment.

Then, the solution containing the residual ammonium chloride is introduced into the exhaust gas heating tank 71 from the first settling tank 13 via a pipe 28. In this case, another exhaust gas kept at 100° C. or more is contacted with the exhaust gas heating tank 71 via a pipe not shown. The exhaust gas may be sprayed directly for the exhaust gas heating tank 71, but only the thermal energy is extracted from the exhaust gas by a heat exchanger not shown so as to heat the exhaust gas heating tank 71. The upper limited temperature of the exhaust gas may be set in the same manner as in the second embodiment.

In this case, the ammonium chloride in the exhaust gas heating tank 71 is thermally decomposed according to the reaction formula (2) to produce ammonia. If the ammonia produced in the exhaust gas heating tank 71 is supplied into the ammonia supplying tank 18 via the pipe 72, therefore, the ammonia as the reaction product to be inherently treated as a salvaged material can be reused directly for the recovering system in this embodiment as shown in FIG. 3. Namely, the ammonium chloride can be directly and efficiently utilized.

$$NH_4Cl \rightarrow NH_3 + HCl \quad (2)$$

The thus produced hydrochloric acid (HCl) is taken out from the exhaust gas heating tank 71 to the outside thereof via a pipe 31.

Other features and advantages are similar to those in first embodiment.

For example, the settling tank 44 in the second embodiment related to FIG. 2 may be substituted with the exhaust gas heating tank 71. In this case, the function/effect of the exhaust gas heating tank 71 is similar to the one as described above. This embodiment including the exhaust gas heating tank 71 may be also a modified embodiment for the second embodiment.

Fourth Embodiment

Figure 4:
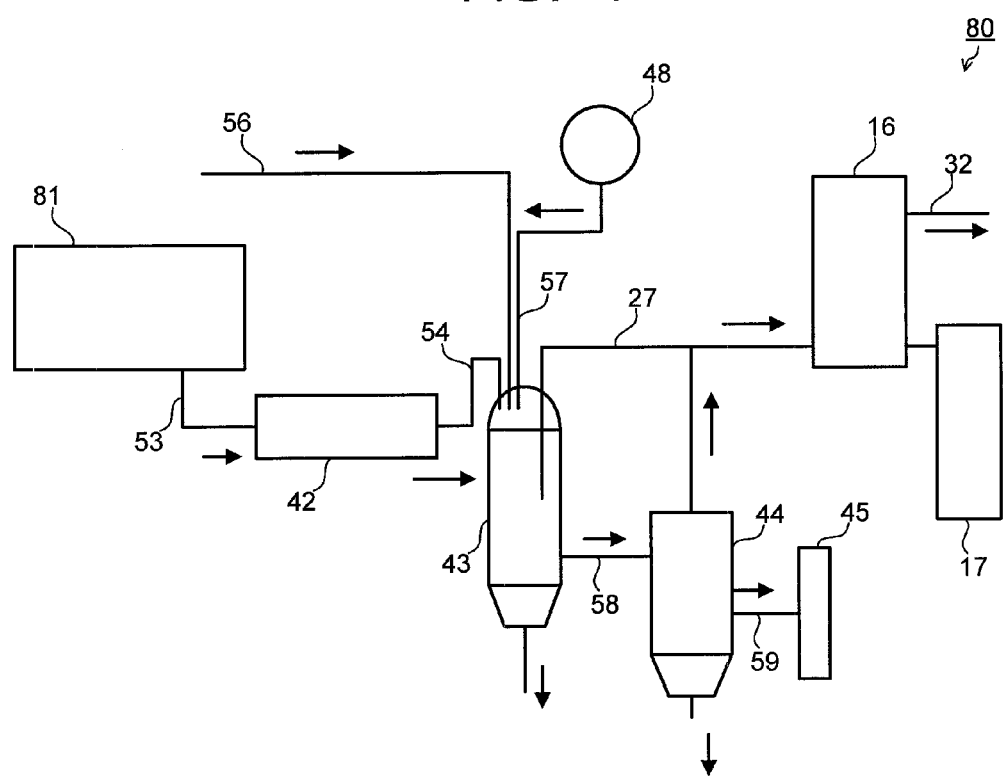
FIG. 4 is a schematic view showing the structure of a system for removing carbon dioxide from an exhaust gas utilizing seawater according to a fourth embodiment.

FIG. 4 is a schematic view showing the structure of a system for removing carbon dioxide from an exhaust gas utilizing seawater according to this embodiment. This embodiment is a modified embodiment for the second embodiment related to FIG. 2.

Concretely, the system structure in this embodiment is different from the system structure in the second embodiment in that the seawater concentrating tank 41 in FIG. 2 is substituted with a seawater desalination plant 81 utilizing reverse osmosis membrane method. Since no moisture is produced prior to the absorption of carbon dioxide accompanied with the provision of the seawater desalination plant 81, the cooling tank 16 and the third reservoir 17 are provided in parallel with the second reservoir 45 for reserving the dilute ammonium chloride aqueous solution produced by removing the ammonium chloride from the solution containing the ammonium chloride as a reaction product in the same manner as in the first embodiment, instead of the cooling tank 46 and the third reservoir 47.

The seawater desalination plant 81 utilizing the reverse osmosis membrane method is configured such that pressure is applied to the side of seawater of the permeation membrane of the plant 81 so as to soak fresh water out from the side opposite to the seawater side thereof. By repeating this process, the seawater at the seawater side of the permeation membrane is concentrated to be converted into salt water of high concentration. In this embodiment, therefore, the seawater at the seawater side of the permeation membrane is taken out as concentrated seawater, which is used instead of the concentrated seawater obtained at the seawater concentrating tank 41 in the second embodiment. The subsequent absorption of carbon dioxide and recovery of sodium hydrogen carbonate and ammonium chloride are conducted in the same manner as in the second embodiment.

Moreover, moisture vapor produced by spraying is made fresh water and reserved using the cooling tank 16 and the third reservoir 17 in the same manner as in the first embodiment.

Other features and advantages are similar to those in first embodiment.

According to the third embodiment, the exhaust gas heating tank 17 may be provided instead of the settling tank 44. In this case, the function/effect of the exhaust gas heating tank 44 is similar to the one as described above. Therefore, this embodiment including the exhaust gas heating tank 71 may be also a modified embodiment for the third embodiment.

In all of the embodiments, moreover, the moisture vapor produced in the absorption of the carbon dioxide and the recovery of the reaction products is cooled so as to be recovered as fresh water. However, such a process as recovering the fresh water is not essential in these embodiments but may be omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for removing carbon dioxide in an exhaust gas utilizing seawater, the method comprising:
    contacting seawater with a hot exhaust gas, which is not cooled and is more than 100° C., to evaporate moisture in the seawater and thereby produce a concentrated seawater wherein concentration of salt is increased;
    blowing ammonia into the concentrated seawater so as to be saturated, thereby producing an ammonia-saturating concentrated seawater;
    contacting a non-heated exhaust gas under a state of non-heat with the ammonia-saturating concentrated seawater such that carbon dioxide in the non-heated exhaust gas is absorbed in the ammonia-saturating concentrated seawater;
    recovering a sediment of sodium hydrogen carbonate produced by the absorption of the carbon dioxide by the ammonia-saturating concentrated seawater; and
    spraying a solution containing ammonium chloride, which is produced by the absorption of the carbon dioxide by the ammonia-saturating concentrated seawater, utilizing pressure of the non-heated exhaust gas while cooling the solution with heat of evaporation of a solvent of the solution, to thereby settle out and recover the ammonium chloride.

2. The method of as set forth in claim 1, further comprising:
    cooling a moisture vapor produced by the spraying of the solution and recovering the moisture vapor as fresh water.

3. The method of claim 1, further comprising:
cooling a moisture vapor produced by the contact of the seawater with the hot exhaust gas, and recovering the moisture vapor as fresh water.

4. The method of claim 1, wherein the non-heated exhaust gas is an exhaust gas at room temperature (about 20° C.).

5. The method of claim 1, wherein the solvent comprises water and optionally non-reacted ammonia.

6. The method of claim 1, wherein the solution containing ammonium chloride is cooled to about 0° C.

7. The method of claim 1, wherein a ratio of recovery (ratio of immobilization) of carbon dioxide is about 88%.

8. The method of claim 1, wherein a salt concentration of the concentrated seawater ranges from about 3.5 wt % to about 25 wt %.

9. The method of claim 1, wherein a salt concentration of the ammonia-saturating concentrated seawater is about 25 wt %.

10. The method of claim 1, further comprising thermally decomposing the ammonium chloride to form hydrogen chloride and recovered ammonium.

\* \* \* \* \*